US010617955B1

(12) United States Patent
Ashman

(10) Patent No.: US 10,617,955 B1
(45) Date of Patent: Apr. 14, 2020

(54) TESTING AND DELIVERY OF GAME DESIGN ASSETS IN A SERVICE PROVIDER ENVIRONMENT

(71) Applicant: Amazon Technologies, Inc., Seattle, WA (US)

(72) Inventor: Kevin Kalima Ashman, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 920 days.

(21) Appl. No.: 14/666,967

(22) Filed: Mar. 24, 2015

(51) Int. Cl.
  *A63F 9/24* (2006.01)
  *A63F 13/63* (2014.01)

(52) U.S. Cl.
  CPC .................................. *A63F 13/63* (2014.09)

(58) Field of Classification Search
  CPC .... G07F 17/32; G07F 17/3223; G07F 17/323; F06F 11/3664; F06F 11/3616; F06F 11/3409; F06F 11/3466
  USPC ......................................... 463/20, 25, 29, 30
  See application file for complete search history.

(56) References Cited

U.S. PATENT DOCUMENTS

| | | | | |
|---|---|---|---|---|
| 6,166,748 A * | 12/2000 | Van Hook | ............... | A63F 13/00 345/522 |
| 6,664,958 B1 * | 12/2003 | Leather | ................... | G06T 15/40 345/421 |
| 6,721,713 B1 * | 4/2004 | Guheen | ................... | G06Q 50/01 705/1.1 |
| 7,130,807 B1 * | 10/2006 | Mikurak | ................ | G06Q 10/06 705/7.25 |
| 7,165,041 B1 * | 1/2007 | Guheen | .................. | G06Q 30/04 705/26.1 |
| 7,315,826 B1 * | 1/2008 | Guheen | ............... | G06F 17/3089 703/27 |
| 7,576,748 B2 * | 8/2009 | Van Hook | ............. | G06T 15/005 345/545 |
| 8,121,874 B1 * | 2/2012 | Guheen | ................ | G06Q 10/063 705/28 |
| 8,862,950 B1 * | 10/2014 | Ginsberg | ............ | G06F 11/3688 714/25 |
| 8,968,087 B1 * | 3/2015 | Gault | ...................... | A63F 13/10 345/630 |
| 9,020,871 B2 * | 4/2015 | Lane | .................... | G06N 99/005 706/45 |
| 9,630,108 B2 * | 4/2017 | Zhang | .................. | A63F 13/833 |
| 2006/0046824 A1 * | 3/2006 | Silva | ...................... | G07F 17/32 463/16 |

(Continued)

*Primary Examiner* — James S. McClellan
*Assistant Examiner* — Kevin M Carter
(74) *Attorney, Agent, or Firm* — Klarquist Sparkman, LLP

(57) ABSTRACT

A method for testing game design assets in a service provider environment may include receiving from a client computing device, a request for testing at least one game design asset. The at least one game design asset associated with the received request may be acquired. The at least one game design asset may be tested in a plurality of available test pipelines. The plurality of available test pipelines are implemented on at least one server computer within the service provider environment. Compliance of the at least one game design asset with one or more game engines associated with the plurality of available test pipelines may be determining during the testing. Compatibility information is generated based on the determined compliance, and the test report is communicated to the client computing device.

20 Claims, 9 Drawing Sheets

(56) References Cited

U.S. PATENT DOCUMENTS

| | | | |
|---|---|---|---|
| 2007/0178968 A1* | 8/2007 | Cote-Charpentier | A63F 13/10 463/42 |
| 2009/0128551 A1* | 5/2009 | Bakalash | G06F 9/5044 345/419 |
| 2009/0298576 A1* | 12/2009 | Nguyen | G07F 17/32 463/25 |
| 2010/0223385 A1* | 9/2010 | Gulley | G06F 9/5027 709/226 |
| 2010/0304860 A1* | 12/2010 | Gault | A63F 13/10 463/31 |
| 2012/0204153 A1* | 8/2012 | Peterson | G06F 11/3672 717/124 |
| 2012/0209571 A1* | 8/2012 | Peterson | G06F 11/3616 702/186 |
| 2016/0026557 A1* | 1/2016 | Hwang | G06F 11/3688 717/124 |

\* cited by examiner

TESTING AND DELIVERY OF GAME DESIGN ASSETS IN A SERVICE PROVIDER ENVIRONMENT

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

Game development requires that a large amount of content is developed, which must also match the requirements of the game engine software it will be run on. Many game developers outsource and contract out development of these assets, and upon completion it can be time consuming to integrate the game design assets to match the game engine's specifications.

BRIEF DESCRIPTION OF THE DRAWINGS

Various embodiments in accordance with the present disclosure will be described with reference to the drawings, in which.

DETAILED DESCRIPTION

Figure 1:
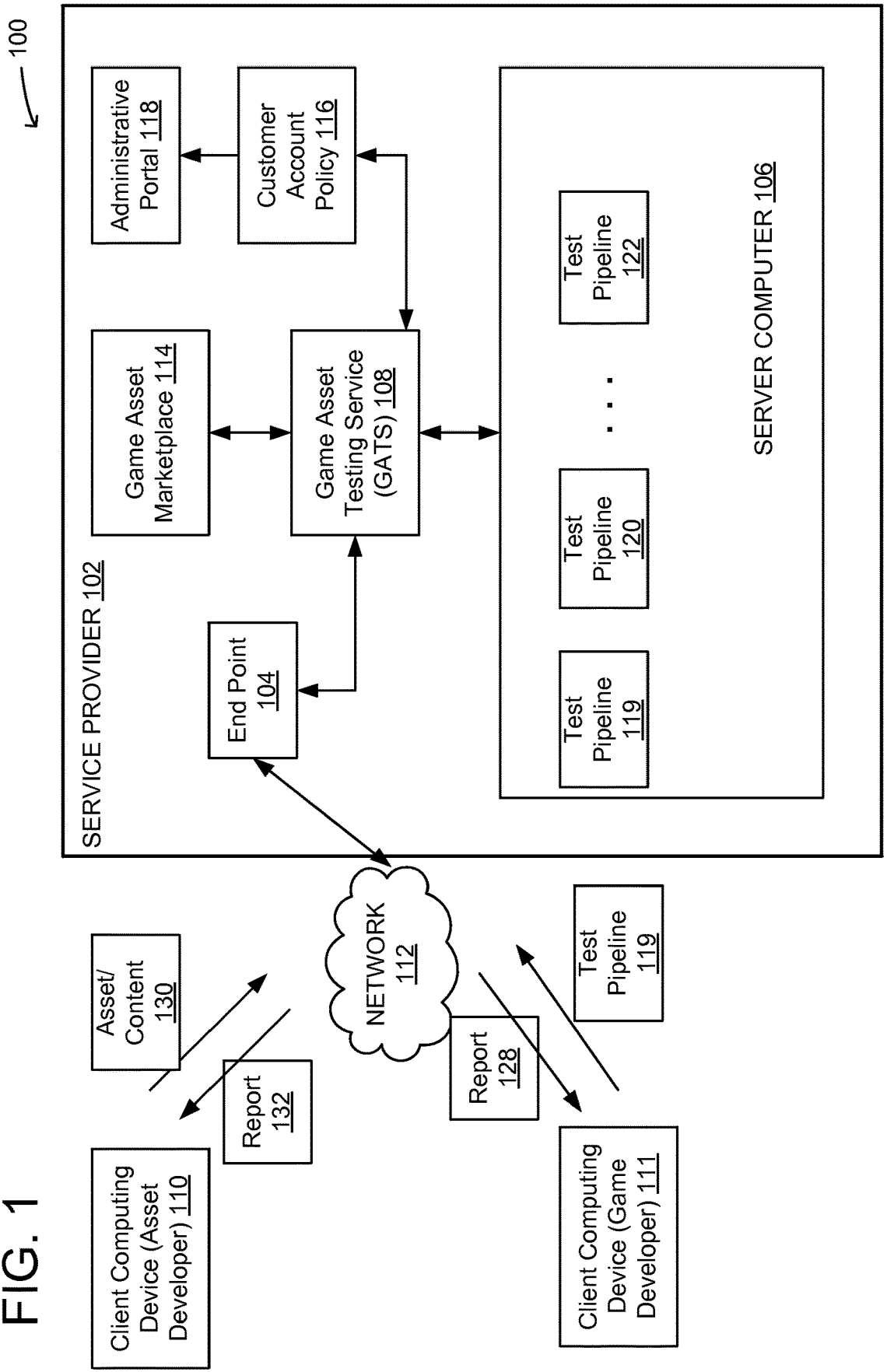
FIG. 1 is a diagram of an example network environment supporting testing game design assets in a service provider environment, in accordance with an embodiment of the disclosure.

The following description is directed to techniques and solutions for testing and delivery of game design assets in a service provider environment. One or more test pipelines may be implemented on a server computer (e.g., running on one or more instances on the server computer). A test pipeline may refer to the process of creating game design assets, for example a character, a building, or an object, for use in interactive content, such as video games. When creating such assets, a video game developer may have need to develop and create different parts of an asset, such how it will look or how it will react to a certain input, independently at different parts of the pipeline. Each test pipeline may include a game engine of a customer (e.g., a game developer), a game editor and/or tools, such as testing and editing tools, among other components. A game asset testing service may be used by the game developer to upload the test pipeline of the developer and/or request testing of one or more game assets (e.g., from a game asset marketplace) with the test pipeline to determine which game assets are compatible with the game engine. Compatibility information, such as a test report, can be generated to indicate which game design assets are compatible with the game engine, as well as indicate why other game design assets are not compatible. A game asset developer may also use the game asset testing service to test game design assets they have developed against one or more of a plurality of available test pipelines or game engines to determine which pipelines (and which game engines of one or more game developers) the game design asset is compatible with. Other compatibility information, such as another test report, may be generated for the asset developer to indicate whether the developer's game design asset is compatible with a selected test pipeline (e.g., of a selected game developer), as well as why there game design asset is not compatible with other test pipelines and how to modify the asset so they are compatible. The compatibility information may also indicate a list of available test pipelines (and corresponding game engines and game developers) the specific asset of the game asset developer is compatible with. In addition, the test system may deliver tested game design assets, along with compatibility information and other metadata, to a game asset marketplace.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment. As used herein, the terms "virtual machine" and "virtual machine instance" are interchangeable.

The term "game design asset" (or "game asset") may generally refer to various types of assets used by game designers for creating games. Game design assets can include 3D models (e.g., as used in 3D games), sprites (images, such as animated images, used in 2D games), sound files, source files and snippets of code, editor extensions, shaders, particle systems, and animation applications. In this regard, game design assets can include various types of game content as well as game code. For example, a game design asset may include a game character or a weapon (e.g., a gun) used in a game. The asset may have multiple properties associated with them (e.g., a gun asset may have specific 3-dimensional characteristics, clip size, color, shape, how can a user interact with it, and so forth).

FIG. 1 is a diagram of an example network environment supporting testing game design assets in a service provider environment, in accordance with an embodiment of the disclosure. Referring to FIG. 1, the network environment 100 may include a service provider 102 in communication with client computing devices 110-11 via the network 112. The service provider 102 may be a multi-tenant cloud network environment where one or more clients (e.g., a game developer user of the client computing device 111) may run one or more virtual machine instances (VMIs) on one or more of server computers (e.g., VMIs 250, . . . , 252 in FIG. 2) (even though only a single server computer 106 is illustrated in FIG. 1, multiple server computers can be used by the service provider 102). The server computers (e.g., 106) may be, for example, client servers operated by (or on behalf of) one or more clients of the service provider 102. The service provider 102 may further comprise a game asset testing service (GATS) 108, an endpoint 104, and a game asset marketplace 114. The game asset marketplace 114 can be used to delivery game assets to other game developers or users.

The server computer 106 may further include one or more test pipelines 119, . . . , 122. A more detailed description of the test pipelines is provided herein below in reference to FIG. 2. Each of the test pipelines may be associated with one or more game developers (e.g., the game developer, such as 111, may be a customer of the service provider 102 and may upload their own test pipeline for testing game design assets, such as test pipeline 119).

The game asset testing service (GATS) 108 may comprise suitable logic, circuitry, interfaces, and/or code and may be operable to provide functionalities associated with game asset testing to one or more customers of the service provider 102. More specifically, the GATS 108 may be configured to test a game design asset for compatibility with one or more game engines (e.g., a game engine may be implemented with a corresponding game editor and testing tools in a test pipeline, as illustrated herein). In this regard, the GATS 108 may be configured to convert the game design asset (e.g., using the game editor and/or the testing tools of a test pipeline) into a format compatible with a game engine. The converted game design asset may be further stored in a game asset marketplace (e.g., together with the original game design asset).

The GATS 108 may allow a game asset developer (e.g., user of device 110) to test a specific game design asset (e.g., game asset 130) for compliance with one or more test pipelines (e.g., 119, . . . , 122) associated with one or more game developers. The game asset developer may test their game design asset against a specific test pipeline or against a plurality of available test pipelines. As part of the testing process, the GATS 108 may generate a converted game design asset, which may be in a format compatible with the game engine of the test pipeline being used for testing. A compliance report (e.g., 132, which may include compatibility information of the game design asset with the game engine of the test pipeline) and/or the converted game design asset may be sent back to the asset developer after the GATS 108 completes the testing. In addition, the game design asset may be placed in the market place 114, with or without the associated data indicating compatibility.

The GATS 108 may also be used by a game developer (e.g., user of device 111) to upload a test pipeline specific for the game developer (e.g., test pipeline 119 may be uploaded and installed at server 106), as well as to test one or more available game design assets against the game developer's own test pipeline (e.g., 119) to determine which game assets are compatible and can be used by the game developer with their own game engine. As part of the testing process, the GATS 108 may generate a converted game design asset, which may be in a format compatible with the game engine of the test pipeline being used for testing. A report from the testing (e.g., report 128, which may include compatibility information of the game design asset with the game engine of the test pipeline) may be provided back to the game developer, where the report may indicate whether a specific game design asset is compliant with the developers game engine and/or a list of a plurality of game assets (e.g., available within the marketplace 114) that are compliant/compatible with the developer's game engine (e.g., as used within the developer's test pipeline 119). Optionally, the converted game design asset may be stored (e.g., with the original game design asset) in a game design marketplace for subsequent access by one or more game developers and/or game asset developers.

The game asset marketplace 114 may be used as a repository for game design assets (e.g., game design assets available for sale to one or more customers of the service provider 102). The game asset marketplace may be implemented on a separate server computer, or may be part of the server computer 106 or the GATS 108. In an example embodiment, the game asset marketplace 114 may store game assets where one or more of the game assets have been tested with one or more of the test pipelines 119, . . . , 122. Tested game assets may also include metadata (or a report) providing details on which test pipelines the asset is compliant with.

The client computing devices 110-111 may be used for providing access to the GATS 108 and the service provider 102. In an illustrative embodiment, the client computing devices 110-111 can correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In an illustrative embodiment, the client computing devices 110-111 include necessary hardware and software components for establishing communications over the communication network 112, such as a wide area network or local area network. For example, the client computing devices 110-111 may be equipped with networking equipment and browser software applications that facilitate communications via the Internet or an intranet with one or more of the server computers 106 in the service provider 102. The client computing devices 110-111 may have varied local computing resources such as central processing units and architectures, memory, mass storage, graphics processing units (GPUs), communication network availability and bandwidth, etc.

The endpoint 104 may comprise suitable logic, circuitry, interfaces, and/or code and may be operable to provide authentication of one or more service provider clients (e.g., user of the client devices 110-111) and facilitate communication between the client computing devices 110-111 and the server computers (e.g., 106). The endpoint 104 may comprise one or more of a secure gateway, router, and/or another network device operable to use one or more communication links associated with at least one of a plurality of communication protocols. Additionally, the endpoint 104 may be a cloud endpoint located in one of a plurality of separate regions (e.g., separate geographic regions) associated with the service provider 102.

The customer account policy 116 may specify one or more policies related to game asset testing functionalities used in connection with one or more users of the service provider environment 102. For example, the customer account policy 116 may be associated with a game asset developer and may specify one or more test pipelines the asset developer is authorized to test their assets with. The customer account policy 116 may be associated with a game developer and may specify one or more settings of the game developer's test pipeline, location of assets tested by the developer and so forth. The policy document 116 may be updated by, for example, an administrator via the administrative portal 118.

In accordance with an example embodiment of the disclosure, the GATS 108 may be implemented as a stand-alone service within the service provider 102 (as illustrated in FIG. 1) or it may be implemented as a code library (i.e., software) within one or more of the server computers (e.g., 106).

Figure 2:
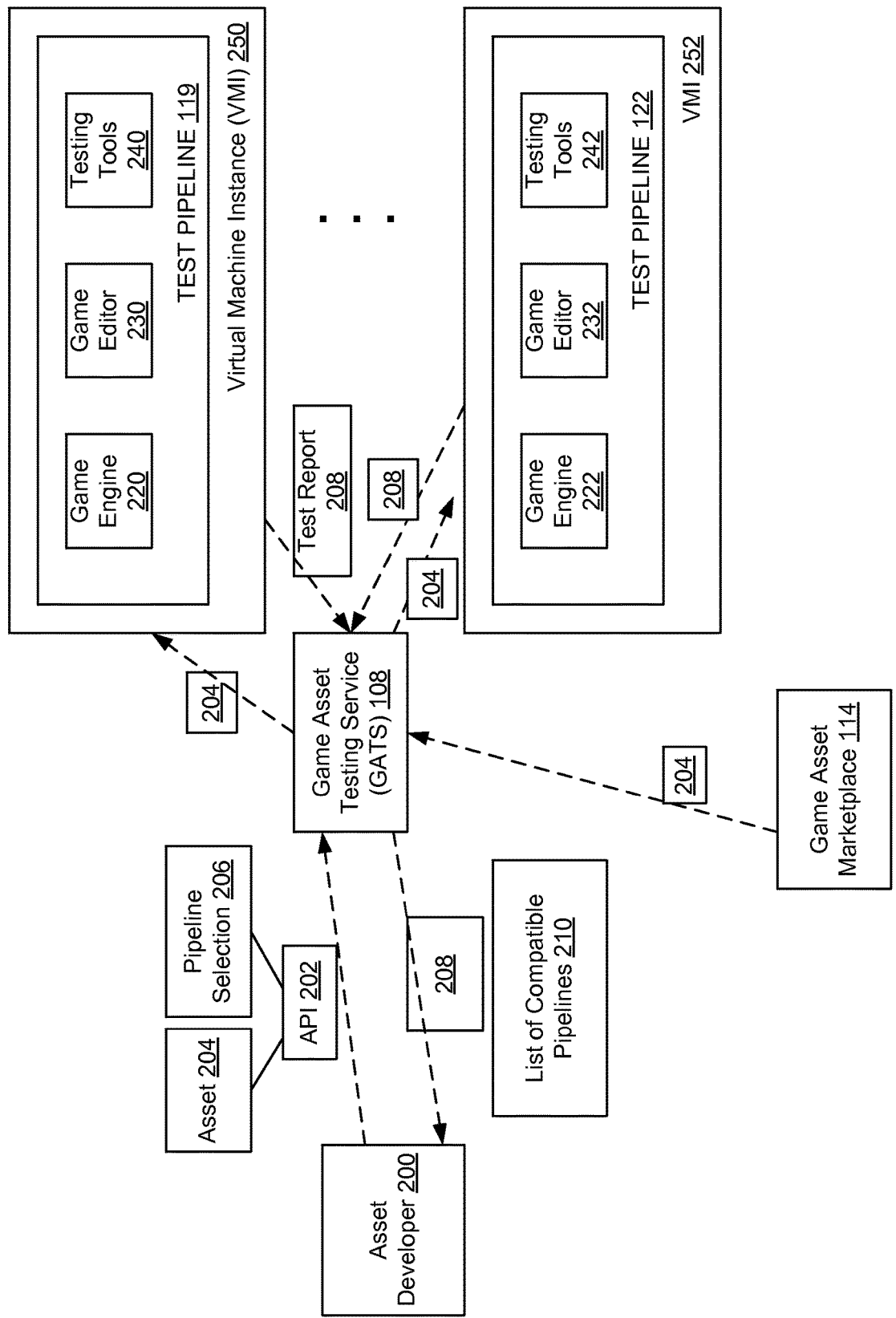
FIG. 2 is a block diagram of an example network environment, which may be used by a game asset developer for testing game design assets, in accordance with an embodiment of the disclosure.

FIG. 2 is a block diagram of an example network environment, which may be used by a game asset developer for testing game design assets, in accordance with an embodiment of the disclosure. Referring to FIG. 2, a game asset developer 200 may be a customer of the service provider 102 and may be using computing device 110 in connection with game asset testing services provided by the GATS 108. In accordance with an example embodiment of the disclosure, the game asset developer 200 may send a request 202 (e.g., an API request) to the GATS 108 (e.g., via the endpoint 104) for testing a game asset (e.g., 204) developed by the asset developer 200. The game asset 204 may be communicated to the GATS 108 with the request 202, or the GATS may access/download the asset 204 from another location (e.g., the game asset marketplace 114). The GATS 108 may test the asset 204 using a plurality of available test pipelines 119, . . . , 122.

The test pipelines 119, . . . , 122 may comprise corresponding game engines 220, . . . , 222, game editors 230, . . . , 232, and testing tools 240, . . . , 242. The testing tools 240, . . . , 242 may include various asset testing tools and/or scripts which can be used by the corresponding game editors 230, . . . , 232 to perform game design asset testing. For example, the testing tools 240, . . . , 242 may be used to convert the asset to a format compatible with the corresponding game engine 220, . . . , 222, and then determine compliance with the game engine. In other instances, the game editor 230, . . . , 232 may use the testing tools 240, . . . , 242 to extract one or more characteristics of the game design asset (e.g., naming convention used by the asset, object structure and object characteristics of the asset, and so forth), and compare the extracted characteristics with desired characteristics associated with the corresponding game engine 220, . . . , 222 in order to determine compliance/compatibility of the asset with the game engine.

In accordance with an example embodiment of the disclosure, each of the test pipelines 119, . . . , 122 may be implemented and run from a virtual machine instance (VMI) 250, . . . , 252. The VMIs 250, . . . , 252 may be launched from one or more of the server computers 106.

After testing is complete, each test pipeline 122 may generate feedback, such as test report 208. Each test report 208 may specify whether the asset 204 is compliant with the specific test pipeline. The report 208 may also include a list 210 of the test pipelines the asset is compliant with (the list 210 may also optionally include a list of the pipelines the asset is non-compliant with and the reason the asset is non-compliant, so that the asset developer may revise the asset at a later time to ensure compliance). In some instances, test reports from one or more of the test pipelines 119, . . . , 122 may be consolidated into a single report 208 by the GATS 108. The report 208 (which may or may not include the list 210) may be communicated back to the asset developer 200 for review. In accordance with an example embodiment of the disclosure, the request 202 may also specify a specific test pipeline (or pipelines) for testing the game design asset 204.

Figure 3:
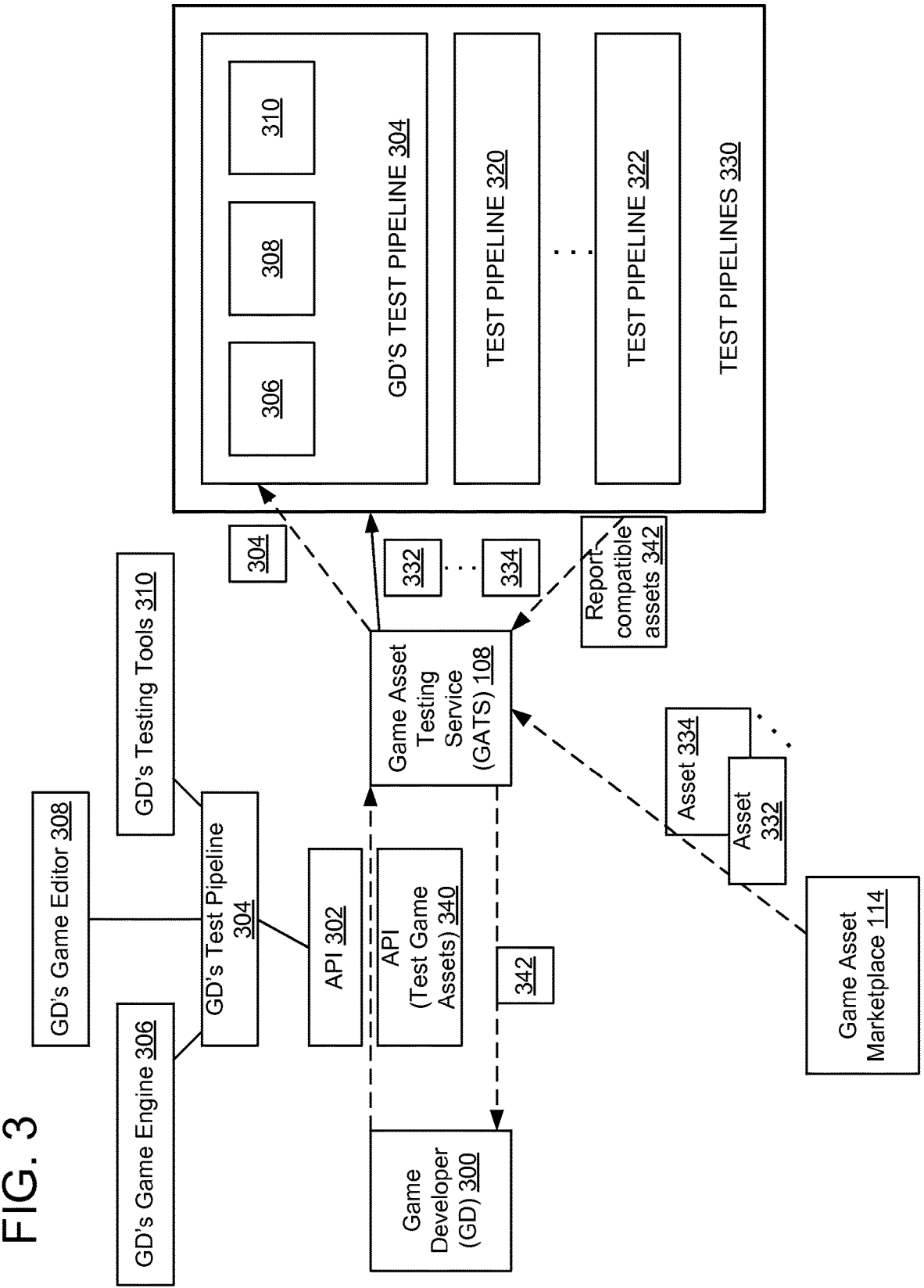
FIG. 3 is a block diagram of an example network environment, which may be used by a game developer for testing game design assets, in accordance with an embodiment of the disclosure.

FIG. 3 is a block diagram of an example network environment, which may be used by a game developer for testing game design assets, in accordance with an embodiment of the disclosure. Referring to FIG. 3, a game developer 300 may be a customer of the service provider 102 and may be using computing device 111 in connection with game asset testing services provided by the GATS 108. In accordance with an example embodiment of the disclosure, the game developer 300 may send a request 302 (e.g., an API request) to the GATS 108 (e.g., via the endpoint 104) for uploading a test pipeline of the developer, such as test pipeline 304. The request 302 may include one or more modules used by the test pipeline 304, such as a game engine 306, a game editor 308, and testing tools 310 (the functionalities of which are explained herein above in reference to FIG. 2). After the GATS 108 receives the test pipeline 304, the GATS 108 may upload the pipeline 304 into the test pipelines module 330. The test pipelines module 330 may be a collection of available test pipelines (e.g., 304, 320, . . . , 322), which may be used by the GATS 108 for testing game assets. The test pipelines module 330 may be implemented using one or more of the server computers 106 (one or more of the test pipelines may be implemented using at least one virtual machine instance running on a server computer). When implemented, the test pipeline 304 (as well as any of the remaining test pipelines 320, . . . , 322) may be used to test one or more game design assets. More specifically, the game editor (e.g., 308) may use one or more of the testing tools (e.g., 310) to convert a game design asset that is being tested into a format compatible with the corresponding game engine (e.g., 306). The converted game design asset may be stored (e.g., in a game asset marketplace such as 114) for subsequent use by an asset and/or game developer. Additionally, the converted game design asset (and/or a compatibility report associated with the converted game design asset) may be provided to the asset and/or game developer after a game design asset testing has been completed.

In some instances, the game developer 300 may also send a request 340 (e.g., an API request) to the GATS 108 (e.g., via the endpoint 104) for testing one or more game assets (e.g., game assets 332, . . . , 334) available within the game asset marketplace 114. The GATS 108 may access (acquire/receive) the game assets 332, . . . , 334, and may communicate the game assets to the test pipelines module 330 for testing by the developer's test pipeline 304 (and/or one or more of the remaining pipelines 320, . . . , 322). After testing of the game assets 332, . . . , 334 is complete, a compliance report 342 with a list of compatible assets may be generated. For example, the report 342 may list all assets that comply with the developer's game engine 306 (and/or any other game engine if multiple test pipelines have been used for testing). The GATS 108 may communicate the generated report 342 back to the game developer 300.

In addition, marketplace 114 may be accessed so as to provide information about available game design assets, for example so that game developers can purchase or download the assets. For instance, a game developer may access the marketplace 114 and search for available game design assets. In response, the marketplace 114 may provide those assets that are compatible with the game developers test pipeline or game engine. In addition, the marketplace 114 may provide other similar assets that are not compatibility, along with data indicating how an asset may be compatible if modified. Furthermore, the marketplace may access data associated with the game developer, such as profile or login data, and return all game assets that are compatible with that developer's pipeline or game engine. The game developer may also be able to upload game design assets into the marketplace 114.

Figure 4:
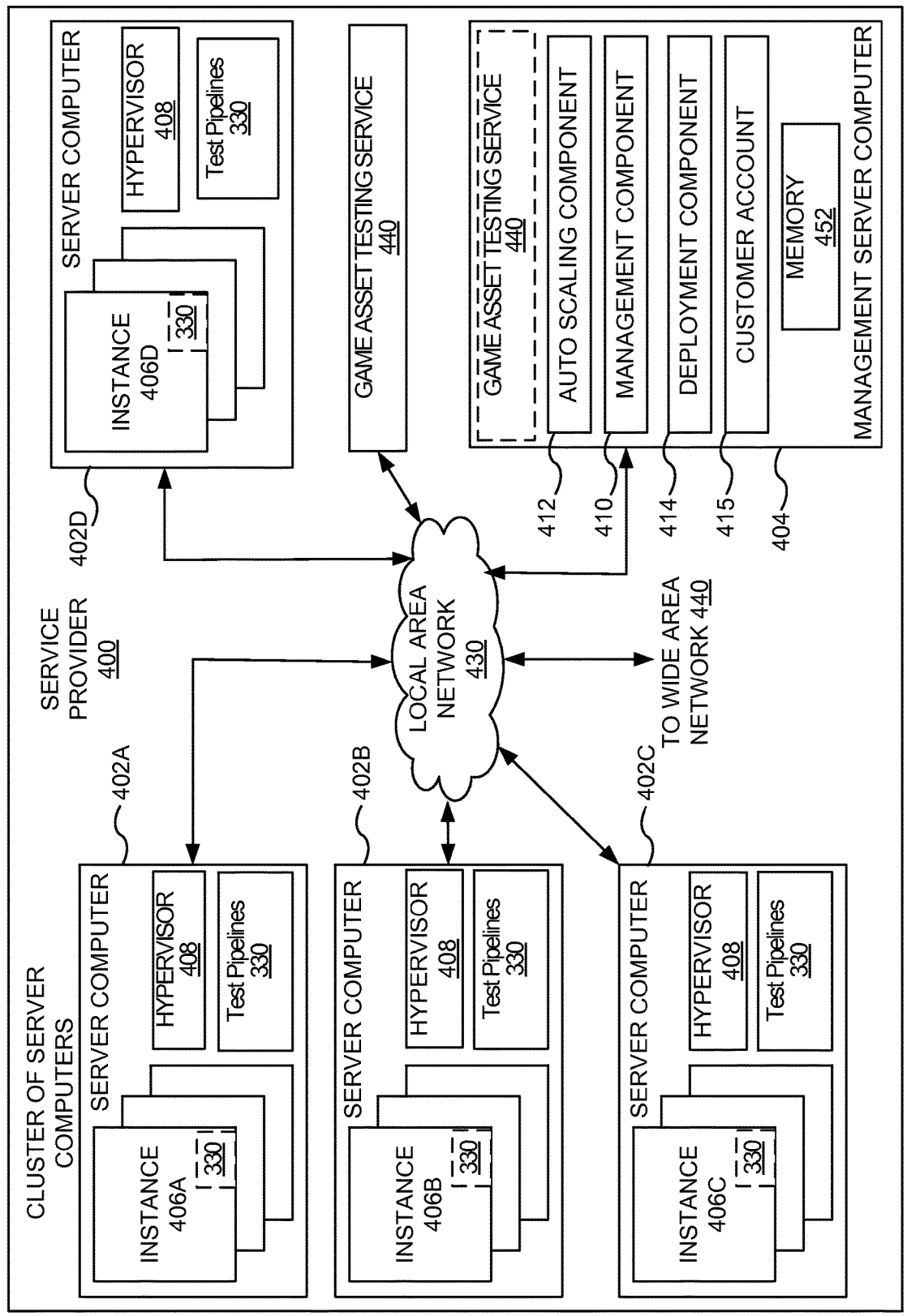
FIG. 4 is an example system diagram showing a plurality of virtual machine instances running in a multi-tenant environment, using a game asset testing service, in accordance with an example embodiment of the disclosure.

FIG. 4 is an example system diagram showing a plurality of virtual machine instances running in a multi-tenant environment, using a game asset testing service, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers). The service provider 400 may be the same as the service provider 102 illustrated in FIGS. 1-3.

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications (e.g., test pipelines 132).

Figure 5:
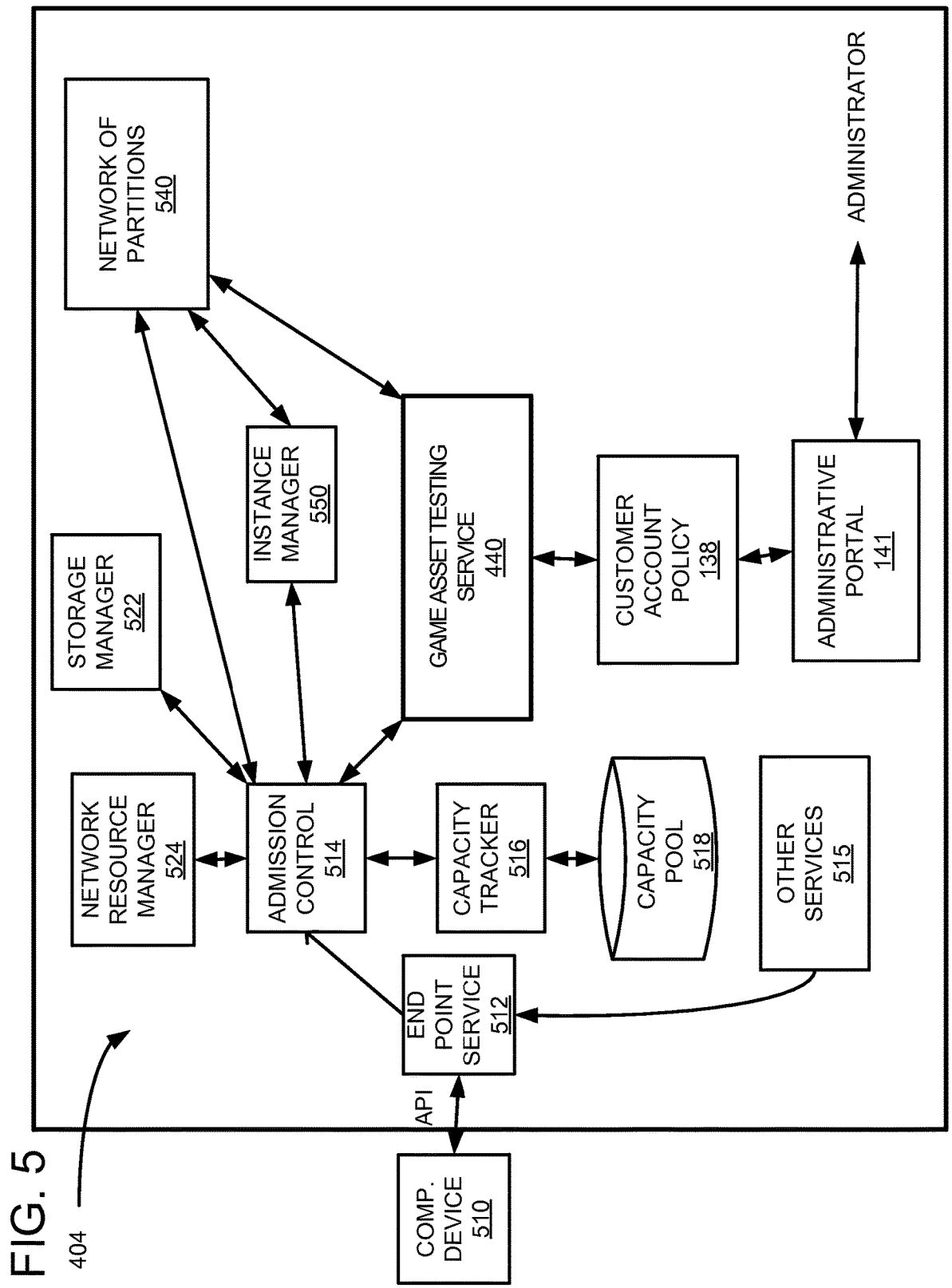
FIG. 5 shows further details of an example system including a plurality of management components associated with a control plane, which may be used to provide game asset testing functions according to one embodiment.

The service provider 400 may also comprise a game asset testing service 440, which may have the functionalities described herein in connection with the GATS 108. The GATS 440 may be implemented as a stand-alone service within the provider 400, as a dedicated server (similar to the servers 402A-402D), as a code library within one or more of the servers 402, and/or may be implemented as part of the server computer 404 that performs management functions. For example, the GATS 440 may be implemented as part of the management component 410 (as seen in FIG. 5). One or more test pipelines 330 may be running on the server computers 402 and/or on the instances 406.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the game asset testing service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand.

The server computer 404 may further comprise memory 452, which may be used as processing memory by the GATS 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to provide game asset testing functions according to one embodiment. More specifically, FIG. 5 illustrates in further detail the management server computer (or management plane) 404, which may implement the game asset testing service 440 within the multi-tenant environment of the service provider 400.

In order to access and utilize server computers and/or instances (such as instances 406 of FIG. 4 and one or more test pipelines running on such instances), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the service provider 400 through an end point 512, which can be a DNS address designed to receive and process application programming interface (API) requests. In particular, the end point 512 can be a web server configured to expose an API. Using the API requests, a customer device 510 can make requests to implement any of the functionality described herein or to access one or more services provided by the service provider 400. Other services 515, which can be internal to the service provider 400, can likewise make API requests to the end point 512. The API requests from the client can pass through the admission control 514 and onto the protocol selection service 440 in order to access protocol selection-related functionalities of the service provider 400.

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The game asset testing service 440 may perform the game asset testing functionalities described herein (e.g., the functionalities described in reference to the GATS 108). The GATS 440 may communicate with the admission control 514 (e.g., to receive game asset testing requests and requests for uploading test pipelines), with the network of partitions 540 (e.g., to access one or more servers or a virtual desktop instance running on a server computer that implements a test pipeline), and the policy document 138 (e.g., as described in connection with FIGS. 1-3).

Figure 6:
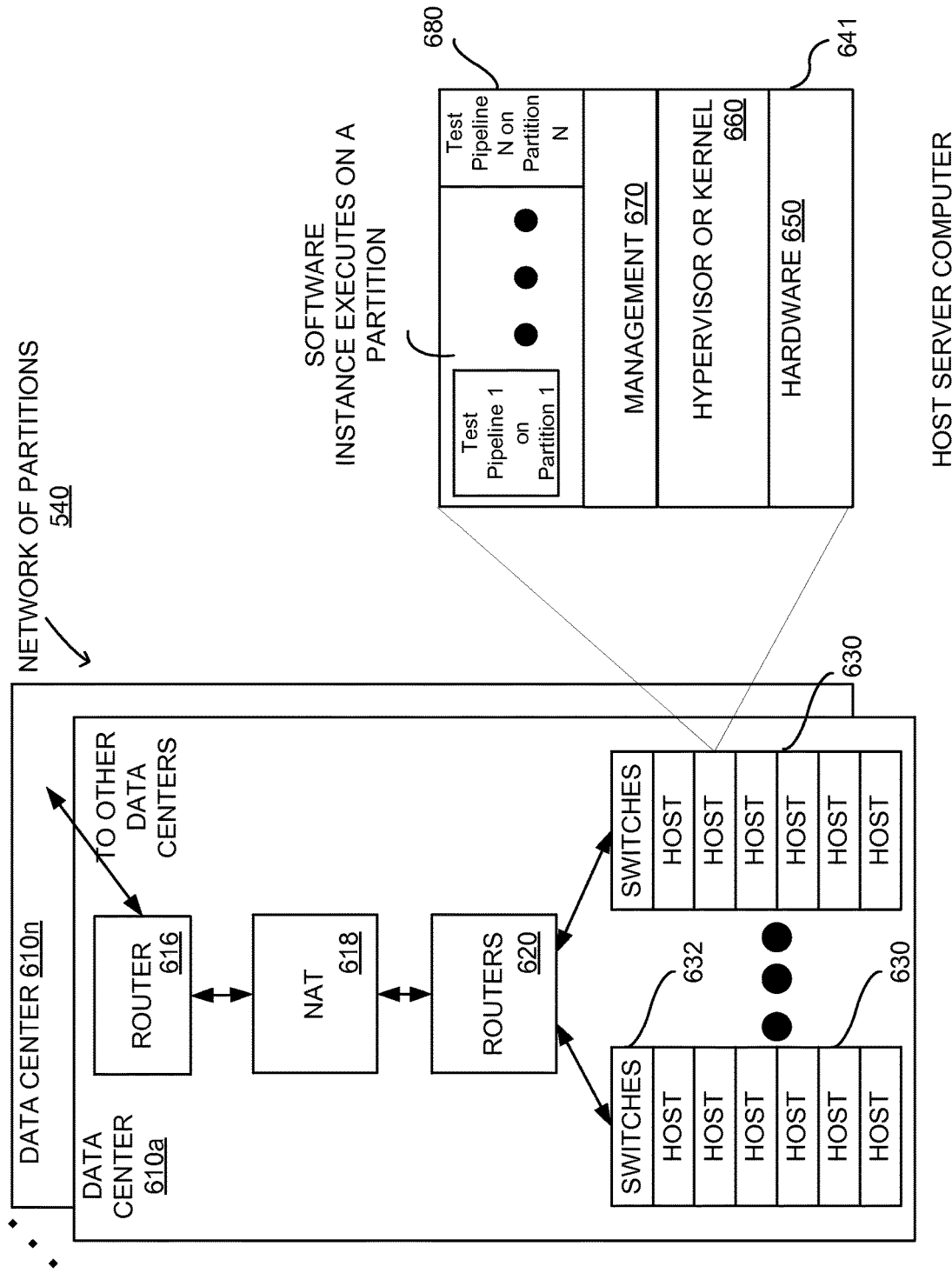
FIG. 6 shows an example of a plurality of host computers, routers, and switches—which are hardware assets used for running virtual machine instances—with the host computers having game asset-related functionalities that may be configured according to one embodiment.

FIG. 6 shows an example of a plurality of host computers, routers, and switches—which are hardware assets used for running virtual machine instances—with the host computers having game asset-related functionalities that may be configured according to one embodiment. More specifically, FIG. 6 illustrates the network of partitions 540 and the physical hardware associated therewith. The network of partitions 540 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650. Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used. In an example embodiment, the hypervisor layer 660 may include the DFS software 409, which may be used to install DSNs or DMNs, as described herein.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions. One or more of the VMIs (VMI1, . . . , VMIn) on partitions 680 may also execute test pipelines (e.g., test pipelines 119, . . . , 122 as described in FIG. 1).

Figure 7:
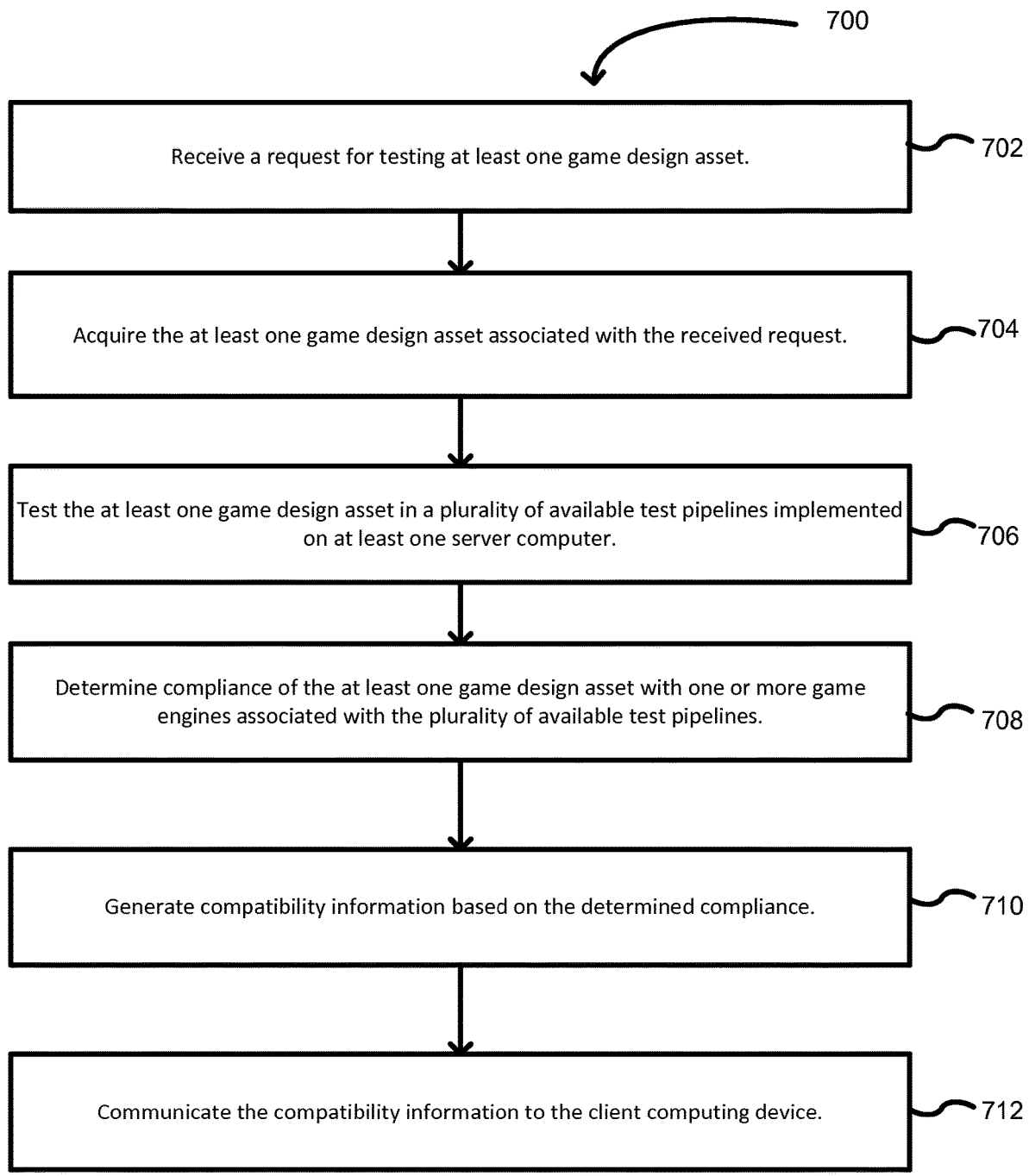
FIGS. 7-8 are flowcharts of example methods of testing game design assets in a service provider environment, in accordance with an embodiment of the disclosure.
Figure 8:
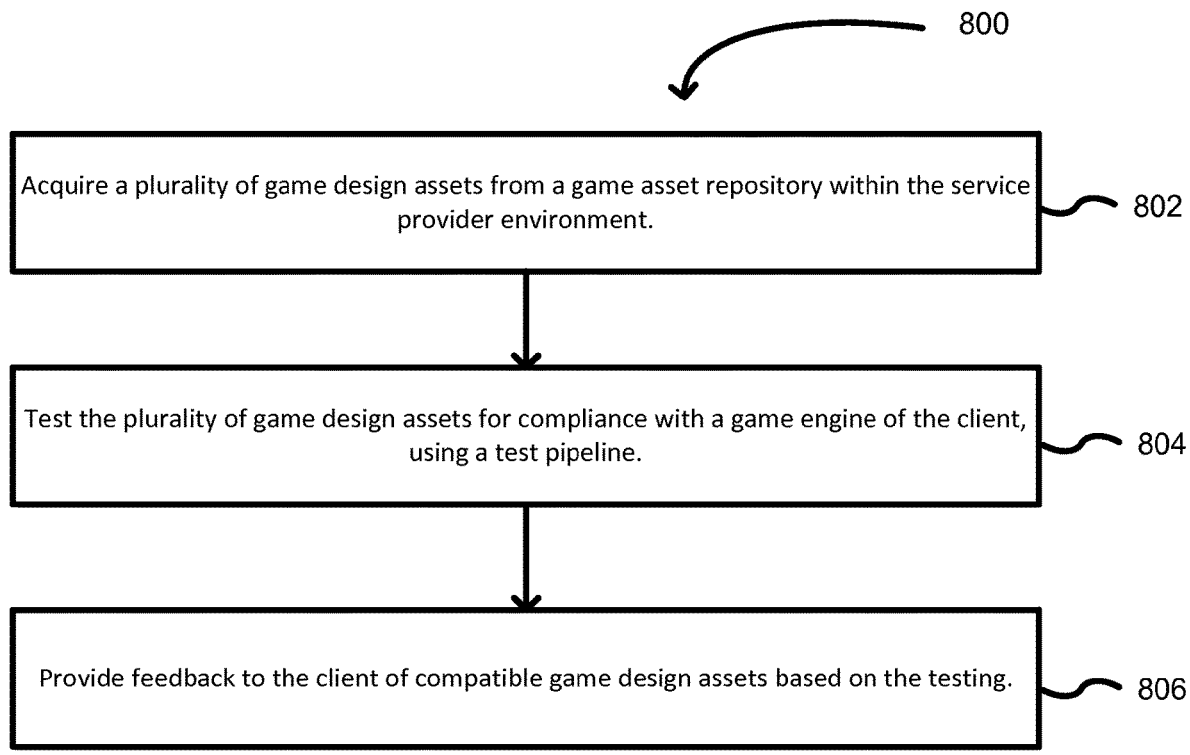

FIGS. 7-8 are flowcharts of example methods of testing game design assets in a service provider environment, in accordance with an embodiment of the disclosure. Referring to FIGS. 1-2 and 7, the example method 700 may start at 702, when a request for testing at least one game design asset is receiving from a client computing device. For example, the GATS 108 may receive API request 202 from the game asset developer 200 using computing device 110. The request 202 may be for testing game design asset 204 developed by the asset developer 200. At 704, the at least one game design asset associated with the received request is acquired. For example, the GATS 108 may receive the game design asset 204 with the request 202, or may access the asset 204 from the game asset marketplace 114. Alternatively, the game asset marketplace 114 may run tests on all game design assets in it and store compatibility data associated with those tests.

At 706, the at least one game design asset is tested in a plurality of available test pipelines. For example, after the GATS 108 receives the game design asset 204, the asset 204 may be sent to the test pipelines 119, . . . , 122 for testing. The plurality of available test pipelines 119, . . . , 122 may be implemented on at least one server computer (e.g., 106) within the service provider environment 102. At 708, compliance of the at least one game design asset with one or more game engines associated with the plurality of available test pipelines may be determined during the testing. For example, testing tools (e.g., 240, . . . , 242) within each test pipeline may be used to determine compliance of the identified game design asset 204 with a corresponding game engine (e.g., 220, . . . , 222). At 710, compatibility information (e.g., a test report) may be generated based on the determined compliance. For example, the GATS 108 may receive compliance information from each test pipeline in connection with testing the game asset 204, and may generate the compliance report 208 (which may also include compatibility information such as the list 210 of compatible game engines). At 712, the compatibility information (e.g., the compliance report 208) (and optionally, including the list 210) may be communicated back to the asset developer 200 using the client computing device 110.

Referring to FIGS. 1, 3-4, and 8, the example method 800 may start at 802, when using a game asset testing service (e.g., 108) of a service provider environment (e.g., 102), a plurality of game design assets may be acquired from a game asset repository within the service provider environment, in response to a request from a client. For example, the client may be a game developer 300 using computing device 111. The game developer 300 may send a request 340 (e.g., an API request) for testing available game design assets (e.g., 332, . . . , 334) using the game developer's test pipeline (e.g., 304). The game design assets 332, . . . , 334 may be accessed from an asset repository, such as the game asset marketplace 114.

At 804, the plurality of game design assets may be tested for compliance with a game engine of the client, using a test pipeline. For example, the GATS 108 may test the game design assets 332, . . . , 334 using the test pipeline 304 provided by the developer 300. The test pipeline 304 includes a game engine 306, a game editor 308, and/or testing tools 310. Additionally, the test pipeline 304 may be implemented on a virtual machine instance (e.g., one or more of the instances 406) running on a server computer (e.g., 402) within the service provider environment (e.g., 400). At 806, the GATS 108 may providing feedback (e.g., report 342) to the developer 300 based on the testing. The feedback (e.g., report 342) may identifying one or more of the plurality of game design assets 332, . . . , 334 that are compatible with the game engine (e.g., 306) of the developer 300. Additionally, the feedback (e.g., report 342) may include information identifying one or more assets that are incompatible with the game engine and, optionally, what aspects of the assets are incompatible (i.e., reason or reasons for incompatibility).

Figure 9:
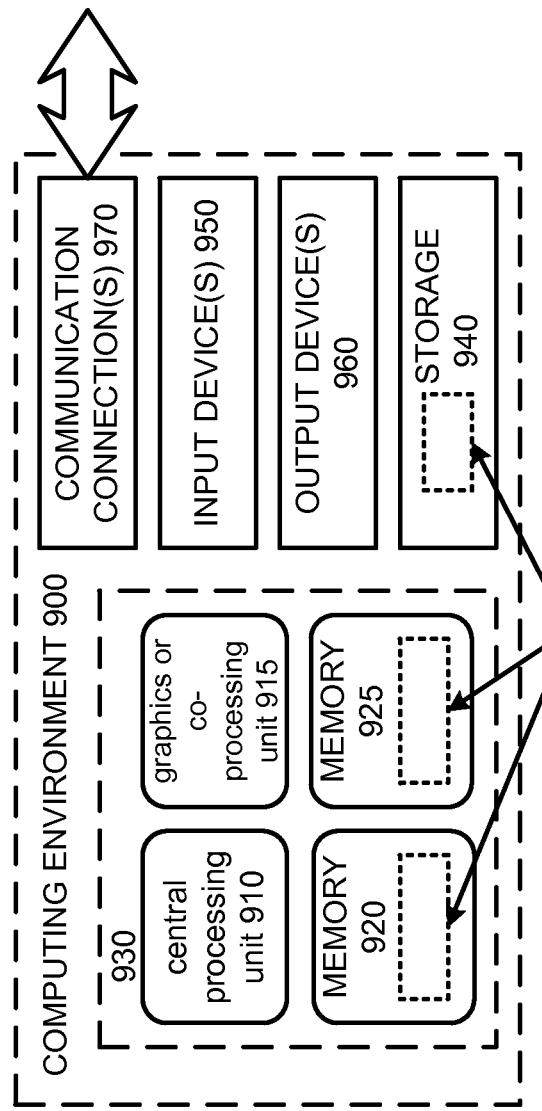
FIG. 9 depicts a generalized example of a suitable computing environment in which the described innovations may be implemented.

FIG. 9 depicts a generalized example of a suitable computing environment in which the described innovations may be implemented. Referring to FIG. 9, the computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations (e.g., functionalities) described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for testing game design assets in a service provider environment, the method comprising:
   receiving, from a client computing device, a request for compatibility testing of at least one game design asset, the request received along with
   the at least one game design asset;
   performing the compatibility testing of the at least one game design asset in a plurality of test pipelines comprising respective game engines, the plurality of test pipelines and the respective game engines implemented on at least one server computer within the service provider environment;
   determining compatibility of the at least one game design asset with the plurality of respective game engines;
   generating compatibility information based on the determined compatibility of the at least one game design asset with at least one of the plurality of respective game engines; and
   communicating the compatibility information to the client computing device.

2. The method according to claim 1, wherein the request identifies the plurality of test pipelines for performing the testing.

3. The method according to claim 1, further comprising:
converting the at least one game design asset to a format compatible with a first game engine of the plurality of game engines.

4. The method according to claim 3, further comprising:
storing the converted at least one game design asset and the compatibility information associated with the converted at least one game design asset in at least one of a repository or a marketplace.

5. A computer-readable storage medium including instructions that upon execution cause a computer system to:
using a game asset testing service of a service provider environment:
in response to a request from a client, acquire a plurality of game design assets from a repository within the service provider environment;
test the plurality of game design assets for compliance with a game engine acquired from the client, using at least one of a plurality of test pipelines, wherein at least one of the plurality of the test pipelines comprises the game engine and is implemented on a virtual machine instance running on a server computer within the service provider environment, and wherein the plurality of testing pipelines is associated with a plurality of game engines including the game engine; and
provide feedback to the client based on the testing, the feedback identifying one or more of the plurality of game design assets that are compatible with the game engine.

6. The computer-readable storage medium according to claim 5, wherein a first test pipeline of the at least one test pipeline further comprises an editor, and wherein the instructions upon execution further cause the computer system to:
convert using the editor, the plurality of game design assets to a format compatible with the game engine.

7. The computer-readable storage medium according to claim 5, wherein the feedback comprises metadata indicating the determined compatibility for the plurality of game design assets, and wherein the instructions upon execution further cause the computer system to store the metadata with the plurality of game design assets in the repository.

8. The computer-readable storage medium according to claim 5, wherein the instructions upon execution further cause the computer system to:
receive a test pipeline upload request from the client, the upload request comprising one or more of the following: the game engine, a game editor, or at least one game testing tool.

9. The computer-readable storage medium according to claim 8, wherein the instructions upon execution further cause the computer system to:
launch one or more of the game engine, the game editor, or the at least one game testing tool on the server computer within the service provider environment.

10. The computer-readable storage medium according to claim 5, wherein the plurality of game design assets comprise one or more of the following:
a 3D model;
a sprite;
a sound file;
a shader;
a particle system; or
an animation clip.

11. The computer-readable storage medium according to claim 8, wherein the instructions upon execution further cause the computer system to:
determine one or more characteristics for at least one of the plurality of game design assets; and
compare the determined one or more characteristics with one or more characteristics associated with the game engine, to determine compatibility of the at least one of the plurality of game design assets with the game engine.

12. A system for testing game design assets in a service provider environment, including a plurality of server computers coupled together through a network, the system comprising:
a repository storing a plurality of game design assets; and
a game asset testing service operable to:
execute a plurality of test pipelines, each comprising a respective game engine, on the server computers;
in response to a request for testing at least one game design asset of the plurality of game design assets from a client device, acquire the at least one game design asset from the repository;
test the at least one game design asset in the plurality of respective game engines;
determine, during the testing, compliance of the at least one game design asset with the plurality of respective game engines;
generate compatibility information based on the determined compliance of the at least one game design asset with the plurality of game engines; and
transmit the generated compatibility information to the client device, wherein the transmitted compatibility information includes an indication that a given asset of the at least one game design asset is compliant with a given engine of the one or more engines.

13. The system according to claim 12, wherein the game asset testing service is further operable to:
convert at least a first game design asset of the plurality of game design assets, that is incompatible with a first game engine of the plurality of game engines, into a format compatible with the first game engine.

14. The system according to claim 12, wherein the request from the client device identifies the plurality of game engines for performing the testing.

15. The system according to claim 13, wherein the game asset testing service is further operable to:
store the converted first game design asset and the compatibility information associated with the converted first game design asset in the repository.

16. The system according to claim 12, wherein the game asset testing service is further operable to:
receive an upload request to upload a test pipeline comprising one or more of the following: a game engine, a game editor, or at least one game testing tool; and
launch the test pipeline on at least one of the plurality of server computers.

17. The method of claim 1, wherein the compatibility information lists at least a first one of the plurality of test pipelines with which the at least one game design asset is determined to be compatible and lists at least a second one of the plurality of test pipelines with which the at least one game design asset is determined to be incompatible.

18. The computer-readable storage medium according to claim 5, wherein the feedback further comprises indication of why other game design assets, of the plurality of game design assets, are incompatible with the game engine.

19. The system according to claim 12, wherein the request is a first request and the client device is a first client device, and the game asset testing service is further operable to:
    receive a second request from a second client device to test a first game design asset with some of the plurality of game engines.

20. The system according to claim 19, wherein the game asset testing service is further operable to:
    receive a download location from the second client device for the first game design asset;
    retrieve the first game design asset from the download location; and
    store the retrieved first game design asset in the repository.

\* \* \* \* \*